US012321115B2

(12) United States Patent
Tanaka et al.

(10) Patent No.: US 12,321,115 B2
(45) Date of Patent: Jun. 3, 2025

(54) HEATING APPARATUS AND IMAGE FORMING APPARATUS

(71) Applicant: CANON KABUSHIKI KAISHA, Tokyo (JP)

(72) Inventors: Masashi Tanaka, Kanagawa (JP); Shingo Ito, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/353,771

(22) Filed: Jul. 17, 2023

(65) Prior Publication Data

US 2024/0036501 A1 Feb. 1, 2024

(30) Foreign Application Priority Data

Jul. 29, 2022 (JP) ................................ 2022-121182

(51) Int. Cl.
*G03G 15/20* (2006.01)

(52) U.S. Cl.
CPC ..... *G03G 15/2053* (2013.01); *G03G 15/2017* (2013.01); *G03G 15/2064* (2013.01); *G03G 2215/00666* (2013.01); *G03G 2215/2019* (2013.01); *G03G 2215/2029* (2013.01)

(58) Field of Classification Search
CPC ........... G03G 15/2017; G03G 15/2039; G03G 15/2042; G03G 15/2053; G03G 15/2064; G03G 2215/00666; G03G 2215/2019; G03G 2215/2029
See application file for complete search history.

(56) References Cited

U.S. PATENT DOCUMENTS

| | | | | |
|---|---|---|---|---|
| 5,525,775 | A | 6/1996 | Setoriyama | |
| 2018/0348676 | A1* | 12/2018 | Kume | G03G 15/206 |
| 2019/0004460 | A1* | 1/2019 | Ogawa | G03G 15/2053 |
| 2020/0363761 | A1* | 11/2020 | Watanabe | G03G 15/2064 |

FOREIGN PATENT DOCUMENTS

| | | |
|---|---|---|
| JP | H11260533 A | 9/1999 |

* cited by examiner

*Primary Examiner* — Sophia S Chen
(74) *Attorney, Agent, or Firm* — Canon U.S.A., Inc., IP Division

(57) ABSTRACT

A heating apparatus includes a heater, a holding member, and a heat equalization member. In a case where a direction of a long side of a first surface of the heater is defined as a longitudinal direction, a direction of the first surface perpendicular to the longitudinal direction is defined as a transverse direction, and a direction perpendicular to the longitudinal direction and the transverse direction is defined as a thickness direction, the heat equalization member is between the heater and the holding member in the thickness direction and includes, in the longitudinal direction, first and second abutment regions that abut against the heater and a first non-abutment region that does not abut against the heater. The first abutment region, the first non-abutment region, and the second abutment region are arranged in this order as viewed from one end toward another end of the heater in the longitudinal direction.

26 Claims, 11 Drawing Sheets

HEATING APPARATUS AND IMAGE FORMING APPARATUS

BACKGROUND

Field

The present disclosure relates to a heating apparatus, and, more particularly, to a heating apparatus for use in an image forming apparatus such as an electrophotographic copy machine or a laser beam printer.

Description of the Related Art

A heating apparatus used in an electrophotographic image forming apparatus discussed in U.S. Pat. No. 5,525,775 uses a film heating method. The heating apparatus using the film heating method includes a heater, a fixing film, and a pressure roller. The heater includes a resistance heating element on a ceramic substrate. The fixing film is heated and rotated while being in contact with the heater. The pressure roller forms a nip portion with the heater via the fixing film.

Further, Japanese Patent Application Laid-Open No. H11-260533 discusses a structure for equalizing heat across a longitudinal direction of a heater by arranging a heat conductive member on a surface of the heater opposite to a surface of the heater on which a heating element is arranged.

SUMMARY

The present disclosure is directed to suppressing thermal deformation of a heat conductive member.

According to an aspect of the present disclosure, a heating apparatus includes a heater including an elongated substrate and a heating element arranged on a first surface of the elongated substrate, a first rotary member configured to be heated by the heater, a second rotary member configured to form a nip portion with the heater via the first rotary member, a holding member configured to hold the heater, and a heat equalization member arranged in contact with a second surface of the elongated substrate that is opposite to the first surface and configured to equalize heat across the elongated substrate, wherein, in a case where a direction of a long side of the first surface of the heater is defined as a longitudinal direction, a direction of the first surface that is perpendicular to the longitudinal direction is defined as a transverse direction, and a direction that is perpendicular to the longitudinal direction and the transverse direction is defined as a thickness direction, the heat equalization member is arranged between the heater and the holding member in the thickness direction, wherein the heat equalization member includes, in the longitudinal direction, first and second abutment regions that abut against the heater, and a first non-abutment region that does not abut against the heater, wherein the first abutment region, the first non-abutment region, and the second abutment region are arranged in this order as viewed from one end side of the heater toward another end side of the heater in the longitudinal direction, and wherein the first non-abutment region is formed by being bent from the first abutment region and the second abutment region toward the holding member in the thickness direction.

Further features of the present disclosure will become apparent from the following description of exemplary embodiments with reference to the attached drawings.

DESCRIPTION OF THE EMBODIMENTS

Exemplary embodiments of the present disclosure will be described below with reference to the drawings. The exemplary embodiments described below are not intended to limit the scope of the subject matter of the terms in the claims in the present disclosure and not all combinations of features described in the exemplary embodiments are essential to the present disclosure.

Image Forming Apparatus

Figure 1:
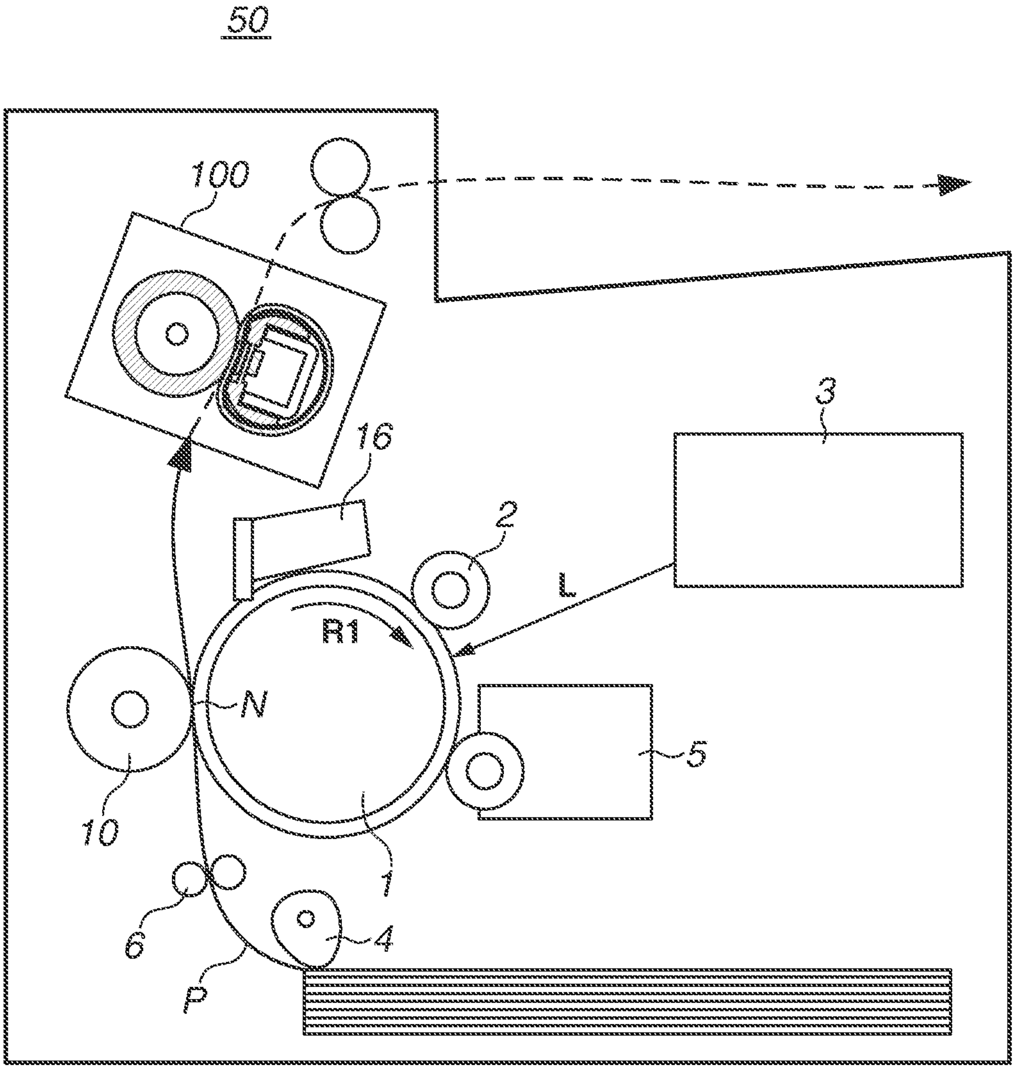
FIG. 1 is a schematic diagram illustrating an example of a configuration of an image forming apparatus.

FIG. 1 is a schematic diagram illustrating a configuration of an image forming apparatus 50 according to a first exemplary embodiment. A charging device 2, an exposure device 3, a development device 5, a transfer roller 10, and a photosensitive drum cleaner 16 are arranged around a circumferential surface of a photosensitive drum 1 in this order along a rotation direction (indicated by an arrow R1). The exposure device 3 is configured to illuminate the photosensitive drum 1 with laser light L. A surface of the photosensitive drum 1 is charged to negative polarity by the charging device 2. An electrostatic latent image is formed on the charged surface of the photosensitive drum 1 by the laser light L emitted from the exposure device 3. In the present exemplary embodiment, toner is charged to negative polarity. The development device 5 stores black toner, and the toner charged to negative polarity is supplied from the development device 5 and adheres to the electrostatic latent image on the photosensitive drum 1, whereby the electrostatic latent image on the photosensitive drum 1 is developed as a toner image T (which is also simply referred to as an image).

Each sheet P fed by a sheet feed roller 4 is conveyed to a transfer nip portion N by a conveyance roller 6. A transfer bias having positive polarity opposite to the polarity of the toner is applied from a power source (not illustrated) to the transfer roller 10, and the toner image T on the photosensitive drum 1 is transferred onto the sheet P at the transfer nip portion N. After the transfer, the toner that remains on the photosensitive drum 1 is removed by the photosensitive drum cleaner 16 including an elastic blade. The sheet P bearing the toner image T is conveyed to a heating apparatus 100, and the toner image T is heated and fixed to the sheet P by the heating apparatus 100.

<Heating Apparatus>

Figure 2A:
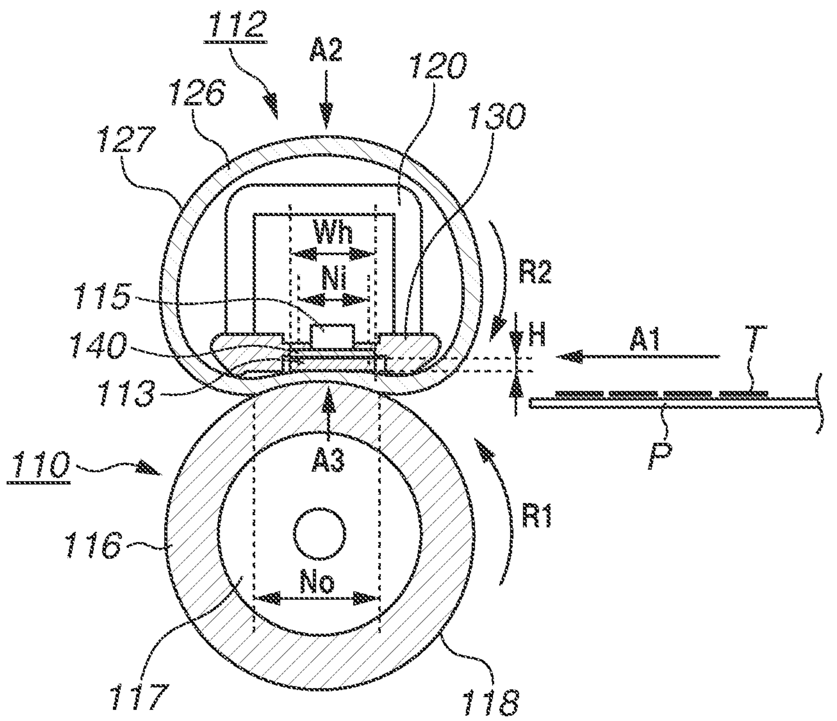
FIGS. 2A and 2B are schematic diagrams illustrating an example of a configuration of a heating apparatus.
Figure 2B:
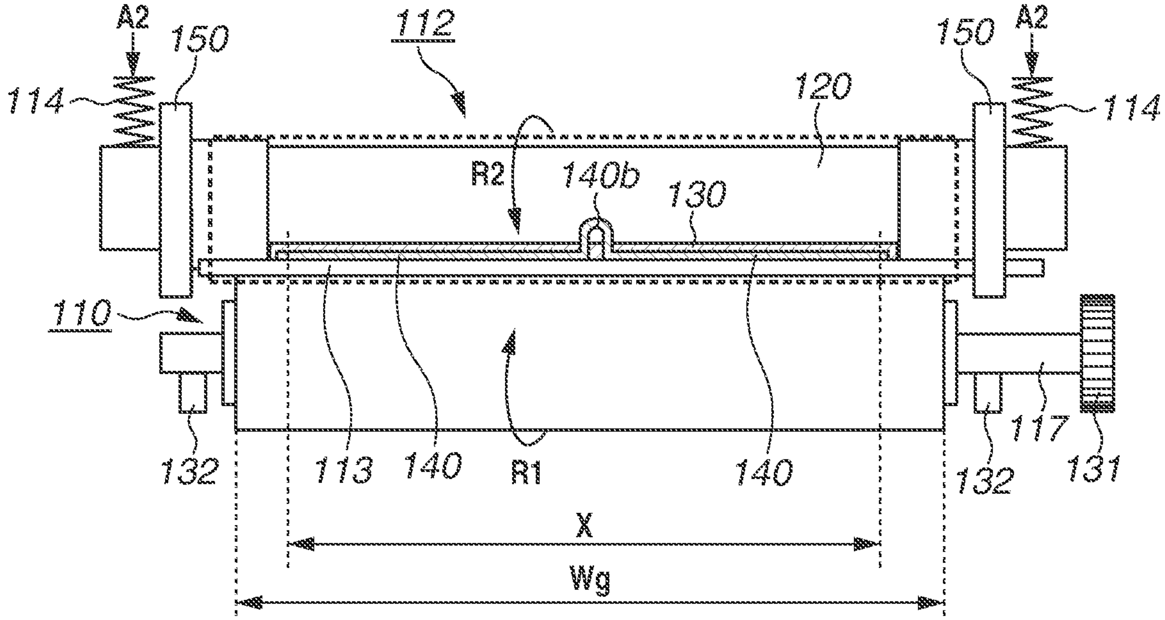

FIGS. 2A and 2B are schematic diagrams illustrating a configuration of the heating apparatus 100. The heating apparatus 100 according to the present exemplary embodiment uses a film heating method in order to reduce a rise time and power consumption. FIG. 2A is a cross-sectional diagram schematically illustrating the heating apparatus 100. FIG. 2B is a diagram schematically illustrating the heating apparatus 100 in a longitudinal direction thereof as viewed from an upstream side in a conveyance direction of the sheet P. To facilitate understanding of how a heater 113 and a heat conductive member 140 are arranged, a fixing film 112 and a heater holder 130 are illustrated in a transparent state. A direction of a long side of the heater 113 having an elongated shape is also referred to as a longitudinal direction (a front-back direction in FIG. 2A), and a direction of a short side of the heater 113 that is perpendicular to the longitudinal direction is also referred to as a transverse direction (a right-left direction in FIG. 2A). A direction of a thickness of the heater 113 that is perpendicular to the longitudinal direction and the transverse direction is also referred to as a thickness direction (an up-down direction in FIG. 2A).

As illustrated in FIG. 2A, the heating apparatus 100 includes the heater 113. Resistance heating elements 201 and 202 (see FIG. 5A) are provided on a front surface (a first surface) of the heater 113. On a back surface (a second surface) of the heater 113, the heat conductive member 140 is arranged between the heater 113 and the heater holder 130. The heater holder 130 serving as a holding member holds the heat conductive member 140 and the heater 113. The fixing film 112 is an endless belt surrounding the heat conductive member 140, the heater 113, and the heater holder 130. In other words, the heater 113 is arranged in an internal space of the fixing film 112. The heater holder 130 is desirably made of a low heat capacity material so that the heater holder 130 does not draw heat easily from the heater 113. In the present exemplary embodiment, the heater holder 130 is made of a liquid crystal polymer (LCP), which is a heat-resistant resin. To provide strength to the heater holder 130, an iron stay 120 supports the heater holder 130 from the opposite side to the heater 113. As illustrated in FIG. 2B, both end portions of the iron stay 120 in the longitudinal direction are pressed by pressure springs 114 in a direction indicated by arrows A2.

As illustrated in FIG. 2A, the heater 113 is in contact with an inner surface of the fixing film 112 serving as a first rotary member, forms an internal nip portion Ni, and heats the fixing film 112 from inside. A pressure roller 110 that faces the heater 113 and serves as a second rotary member forms a fixing nip portion No so that the fixing film 112 is nipped between the heater 113 and the pressure roller 110. As illustrated in FIG. 2B, the pressure roller 110 receives a force from the pressure springs 114 via bearings 132 provided at both end portions of a core metal 117, receives power from a drive source (not illustrated) via a drive gear 131 provided at an end portion of the core metal 117, and is driven in the direction indicated by the arrow R1 in FIG. 2B. When the pressure roller 110 is driven in the direction indicated by the arrow R1 in FIG. 2B, the fixing film 112 receives power from the pressure roller 110 at the fixing nip portion No and is driven and rotated in a direction indicated by an arrow R2.

The fixing film 112 is sometimes biased to the right or left in the longitudinal direction. Thus, as illustrated in FIG. 2B, fixing flanges 150 for regulating the bias are provided at both end portions of the fixing film 112. The fixing flanges 150 are fitted and fixed to the iron stay 120. Both end portions of the fixing film 112 are supported from inside by the fixing flanges 150 outside a sheet-passing region X. When the sheet P with the toner image T in an unfixed state transferred thereto is conveyed from a direction indicated by an arrow A1 in FIG. 2A to the fixing nip portion No, the toner image T is fixed to the sheet P.

<Width and Pressure Distribution of Fixing Nip Portion>

The width of the fixing nip portion No and the pressure distribution of the fixing nip portion No in the longitudinal direction will be described next. In the present exemplary embodiment, the fixing nip portion No is thicker at end portions thereof than at a center thereof. In a case where the sheet P having a relatively large width, such as a letter-size sheet, is passed, heat can be easily dissipated from the end portions of the heater 113, and thus the fixability may decrease at the end portions of the sheet P having a large width. To address the issue, in the present exemplary embodiment, the pressure of the fixing nip portion No is stronger at the end portions than at the center portion, and the width of the fixing nip portion No is larger at the end portions than at the center.

Figure 3A:
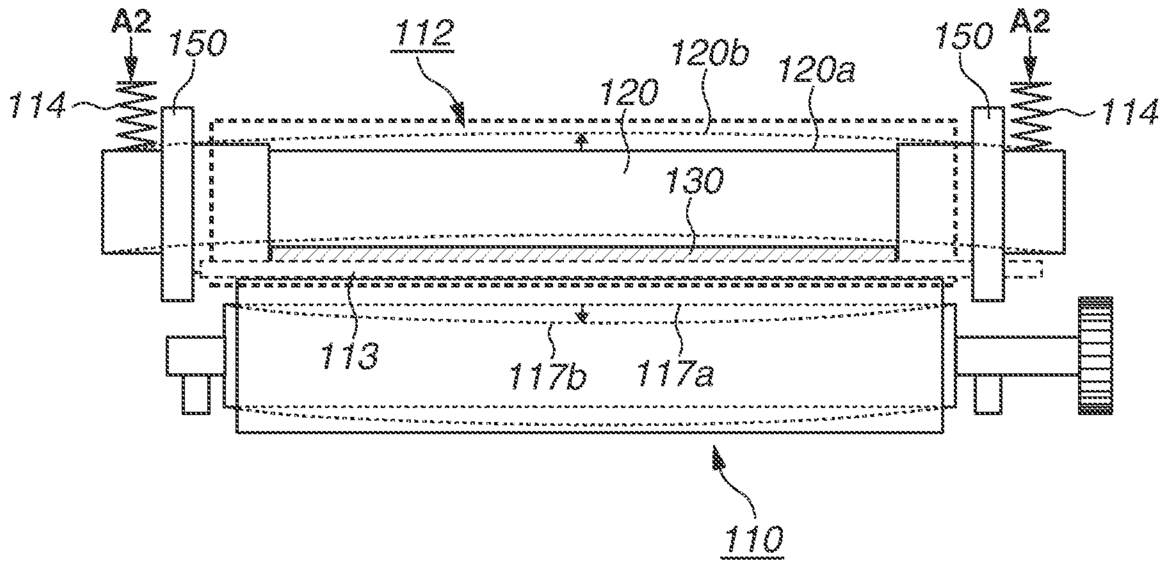
FIGS. 3A and 3B are diagrams illustrating an example of a fixing nip portion.
Figure 3B:
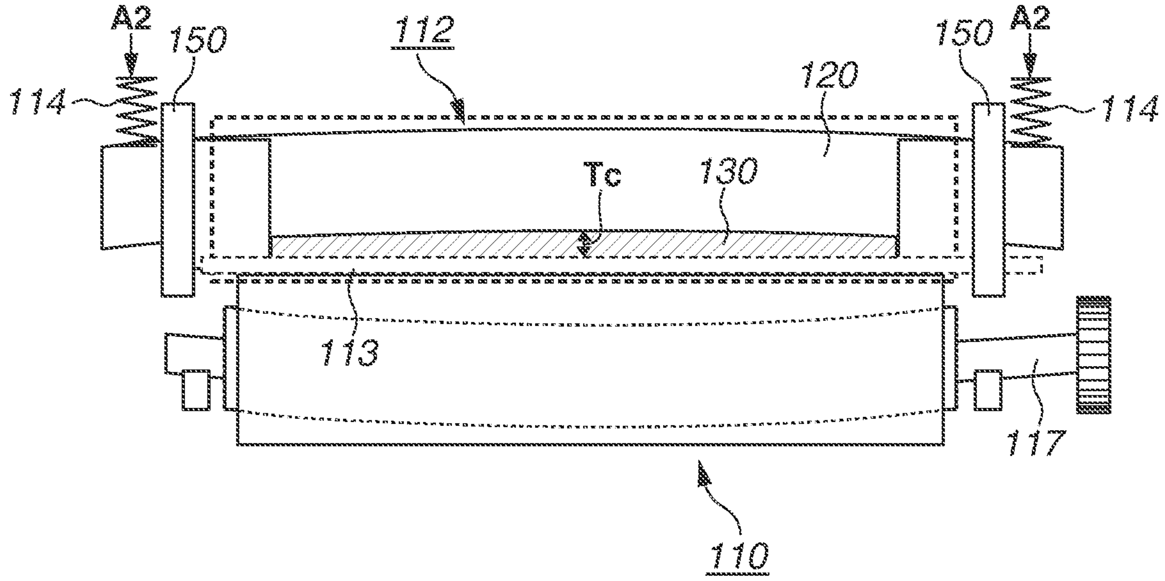

FIGS. 3A and 3B illustrate pressure-caused deflections of the iron stay 120 and the pressure roller 110 in the longitudinal direction. As illustrated in FIG. 3A, both end portions of the iron stay 120 are pressed by the pressure springs 114, and the pressure roller 110 receives pressure via the bearings 132 at both end portions. The pressure deflects the iron stay 120 in a direction from a solid line 120*a* to a dotted line 120*b* and deflects the core metal 117 of the pressure roller 110 in a direction from line 117*a* to line 117*b*. When the iron stay 120 and the pressure roller 110 are deflected, the pressure of the fixing nip portion No at the center portion in the longitudinal direction is lost and becomes weak, and the width of the fixing nip portion No at the center portion becomes narrow. If the width of the fixing nip portion No at the center portion in the longitudinal direction becomes narrow, the fixability at the center portion may decrease. Thus, in order to maintain the fixability, the width of the fixing nip portion No is adjusted.

In the present exemplary embodiment, the fixing nip portion No is adjusted by adjusting the thickness of the heater holder 130. As illustrated in FIG. 3B, a thickness Tc of the center portion of the heater holder 130 is adjusted so that the thickness of the heater holder 130 increases from the end portions to the center portion. This will hereinafter also be referred to as crown correction of the heater holder 130. This adjusts the width of the fixing nip portion No in the longitudinal direction to suppress a decrease in fixability at the center portion. In the present exemplary embodiment, the fixability at the end portions is considered as described above, and the crown correction amount of the heater holder 130 (the difference in thickness between the center portion and the end portions of the heater holder 130) is set at 400 μm so that the width of the fixing nip portion No is thicker by about 10% at the end portions than at the center portion.

Figure 4:
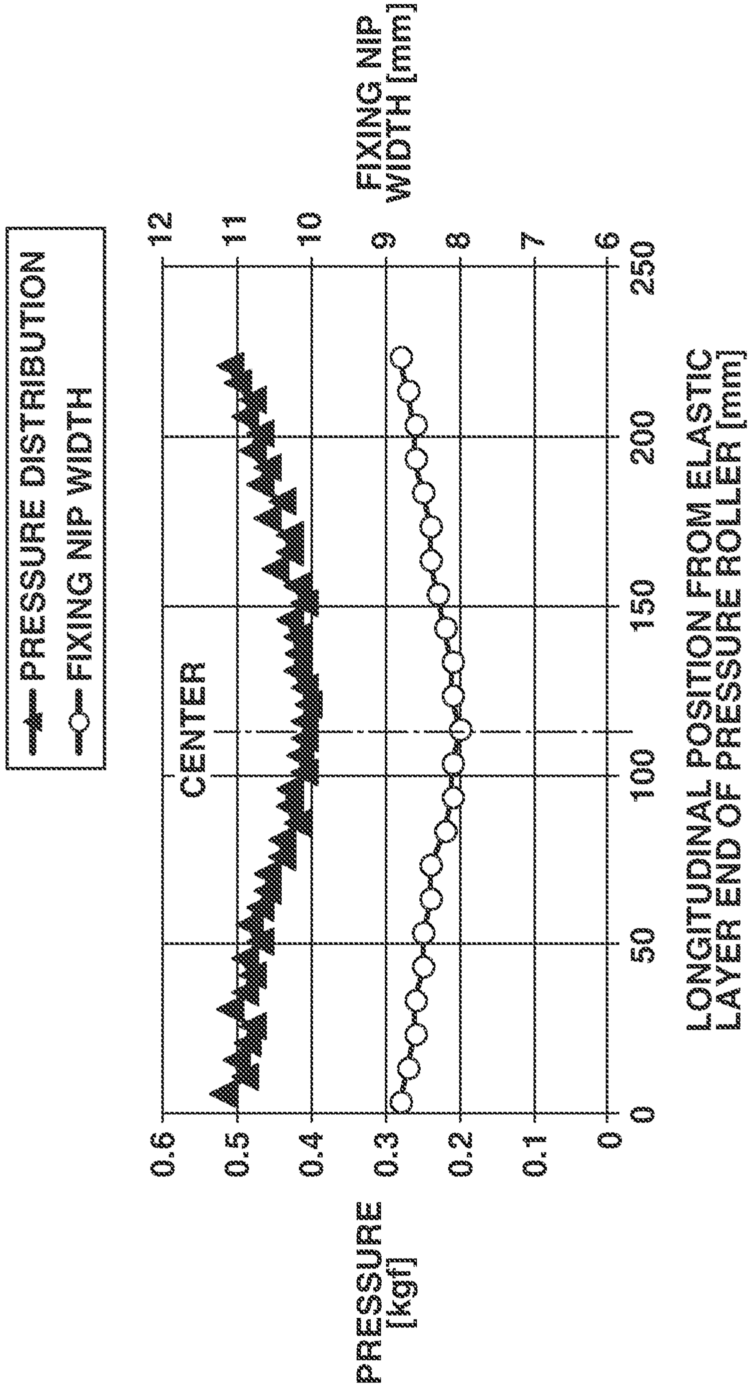
FIG. 4 is a graph of a width of the fixing nip portion against pressure of the fixing nip portion.

FIG. 4 illustrates the width and pressure distribution of the fixing nip portion No in the longitudinal direction of the heating apparatus 100. Measurement of the width of the fixing nip portion No will now be described. The sheet P having a larger width in the longitudinal direction than a width of an elastic layer 116 of the pressure roller 110 in the longitudinal direction, which is 226 mm, is used. A solid black image is printed on an entire region of the sheet P in the longitudinal direction. The sheet P with the solid black image printed thereon is nipped at the fixing nip portion No and heated by the heater 113 in a state where the pressure roller 110 stops driving.

The sheet P is heated for 10 seconds while power input to the heater 113 is controlled so that a temperature detection element 115 detects 150° C. as a temperature of the heater 113. Because the solid black image is heated only at the fixing nip portion No, a gloss on the solid black image increases, and a mark of the fixing nip portion No is transferred to the solid image.

The width of the fixing nip portion No was measured based on the solid image with the mark of the fixing nip portion No transferred thereto.

The width of the fixing nip portion No was measured at 10-mm intervals in the longitudinal direction. The pressure distribution in the longitudinal direction was also measured using a surface pressure distribution measurement system (I-SCAN with a longitudinal resolution of 0.5 mm made by Nitta Corporation).

As indicated by measurement results in FIG. 4, the width of the fixing nip portion No increases from the center to both end portions. More specifically, the width is 8.0 mm at the center portion and is 8.8 mm at each end portion. Like the width of the fixing nip portion No, the pressure distribution in the longitudinal direction has the lowest pressure at the center portion, and the pressure increases toward both end portions. With the configuration of the fixing nip portion No according to the present exemplary embodiment, uniform fixability is achieved in the longitudinal direction.

<Fixing Film>

The fixing film 112 is cylindrical with an outer diameter of 20 mm and has a multi-layer structure in the thickness direction. The layer structure of the fixing film 112 includes a base layer 126 for maintaining film strength and a release layer 127 for reducing adhesion of dirt to the surface. Because the base layer 126 receives heat from the heater 113, the base layer 126 is to be made of a heat-resistant material. Furthermore, because the base layer 126 is slid against the heater 113, the base layer 126 is to have strength. Thus, a metal, such as stainless-used steel (SUS) or nickel, or a heat-resistant resin, such as polyimide, is desirably used. Because metals are stronger than resins, use of a metal makes it possible to reduce the thickness. Furthermore, because metals have high heat conductivity, use of a metal facilitates transmission of heat from the heater 113 to the surface of the fixing film 112. Because resins are smaller in specific gravity than metals, resins have small heat capacities and have an advantage that resins are easily warmed. Furthermore, because resins can be molded into thin films by coating and molding, resins can be molded at low cost.

In the present exemplary embodiment, a polyimide resin is used as the material of the base layer 126 of the fixing film 112, and a carbon-based filler is added thereto to improve heat conductivity and strength. The thinner the base layer 126 is, the more easily the heat of the heater 113 is transmitted to the surface of the pressure roller 110. However, the strength of the base layer 126 decreases. Thus, the thickness of the base layer 126 is desirably about 15 μm to about 100 μm, and the base layer 126 according to the present exemplary embodiment has a thickness of 50 μm.

A fluorine resin, such as a perfluoroalkoxy (PFA) resin, a polytetrafluoroethylene (PTFE) resin, or a tetrafluoroethylene-hexafluoropropylene copolymer (FEP) resin, is desirably used as the material of the release layer 127 of the fixing film 112. In the present exemplary embodiment, PFA having greater releasability and greater heat-resistance among fluorine resins is used. The release layer 127 can be formed by coating a tube or coating the surface with a coating material. In the present exemplary embodiment, the release layer 127 is formed by coating suitable for thin layer molding. The thinner the release layer 127 is, the more easily the heat of the heater 113 is transmitted to the surface of the fixing film 112. However, if the release layer 127 is excessively thin, durability of the release layer 127 decreases. Thus, the thickness of the release layer 127 is desirably about 5 μm to about 30 μm, and the release layer 127 according to the present exemplary embodiment has a thickness of 10 μm.

<Pressure Roller>

The pressure roller 110 has an outer diameter of 20 mm, and the elastic layer 116 (foamed rubber) having a thickness of 4 mm is formed by foaming silicone rubber around the core metal 117 made of iron and having a diameter of 12 mm. The higher the heat capacity and heat conductivity of the pressure roller 110 are, the more easily the heat at the surface of the pressure roller 110 is absorbed inside the pressure roller 110, which makes it difficult for a surface temperature of the pressure roller 110 to rise. In other words, use of a material with the lowest possible heat capacity, low heat conductivity, and great heat insulation effect can shorten the rise time of the surface temperature of the pressure roller 110.

The heat conductivity of foamed rubber formed by foaming silicone rubber is 0.11 W/m·K to 0.16 W/m·K, which is lower than the heat conductivity of solid rubber, which is about 0.25 W/m·K to about 0.29 W/m·K. While the specific gravity, which relates to the heat capacity, of solid rubber is about 1.05 to about 1.30, the specific gravity of foamed rubber is about 0.45 to about 0.85, and foamed rubber is also low in heat capacity. Thus, foamed rubber can shorten the rise time of the surface temperature of the pressure roller 110.

The smaller the outer diameter of the pressure roller 110 is, the lower the heat capacity is. However, if the outer diameter is excessively small, the width of the fixing nip portion No is narrow. Thus, the pressure roller 110 is to have an adequate diameter. In the present exemplary embodiment, the outer diameter is 20 mm. Similarly, if the elastic layer 116 is excessively thin, the heat escapes to the core metal 117 made of metal. Thus, the elastic layer 116 is to have an adequate thickness. In the present exemplary embodiment, the thickness of the elastic layer 116 is 4 mm.

When the pressure roller 110 is heated, the temperatures at end portions of the elastic layer 116 are likely to decrease due to heat dissipation from end surfaces of the core metal 117 and the elastic layer 116. Thus, if a width Wg of the elastic layer 116 in the longitudinal direction is excessively small with respect to a maximum conveyable sheet-passing width, the fixability at the end portions is likely to decrease, whereas if the width Wg of the elastic layer 116 in the longitudinal direction is excessively large, the image forming apparatus 50 increases in width. In the present exemplary embodiment, the width Wg of the elastic layer 116 in the longitudinal direction is 226 mm, which is longer by 5 mm rightward and by 5 mm leftward than the letter size of 216 mm, which is the maximum conveyable width.

On the elastic layer 116, a release layer 118 made of perfluoroalkoxy (PFA) resin is formed as a toner release layer. Like the release layer 127 of the fixing film 112, the release layer 118 can be formed by coating a tube or coating the surface with a coating material. In the present exemplary embodiment, a tube with excellent durability is used. As the material of the release layer 118, a fluorine resin such as PTFE or FEP, a fluorine rubber with excellent releasability, or a silicone rubber with excellent releasability can be used instead of PFA. The lower the surface hardness of the pressure roller 110 is, the lower the pressure for obtaining the width of the fixing nip portion No is. However, if the surface hardness of the pressure roller 110 is excessively low, the durability decreases. Thus, in the present exemplary embodiment, the pressure roller 110 has an Asker-C hardness of 40° (at 4.9N load). The pressure roller 110 is rotated by a rotation unit (not illustrated) at a surface movement speed of 200 mm/sec in the direction indicated by the arrow R1 in FIG. 2A.

<Heater>

The heater 113 includes the resistance heating elements 201 and 202 arranged in series on a substrate 207 (see FIG. 5A) made of ceramic. More specifically, the heater 113 used in the present exemplary embodiment is formed by coating a surface of an alumina substrate having a width Wh of 6 mm in the transverse direction and a thickness H of 1 mm with 10-μm silver-palladium (Ag/Pd) resistance heating elements using screen printing, and placing thereon a 50-μm glass cover serving as a heating element protection layer.

Figures 5A, 5B, 5C, 5D, 5E:
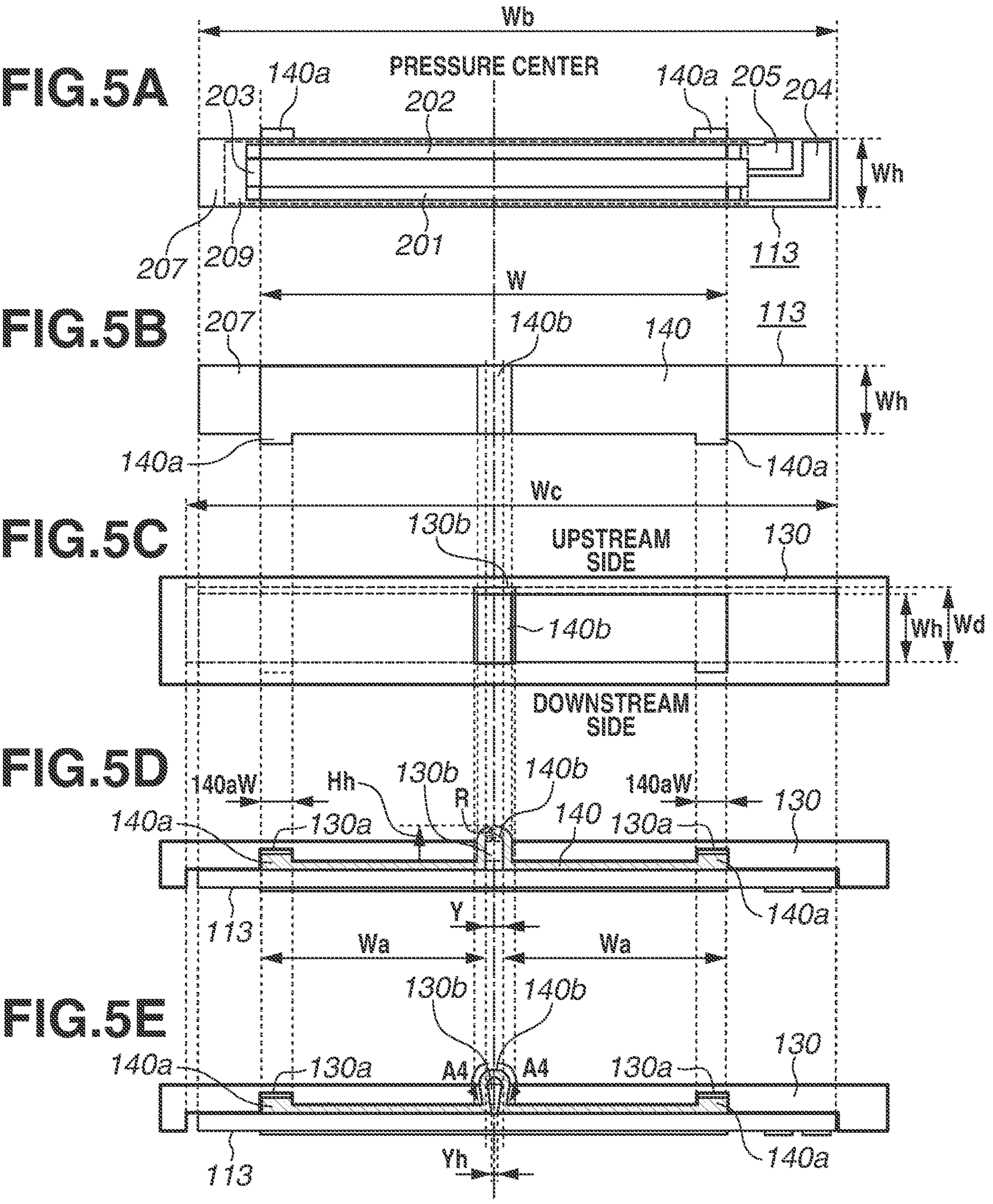
FIGS. 5A to 5E are diagrams illustrating an example of a heat conductive member.

FIG. 5A is a schematic diagram of the heater 113 viewed from a direction indicated by an arrow A3 in FIG. 2A. If a width W of the resistance heating elements 201 and 202 in the longitudinal direction is excessively small with respect to the maximum conveyable sheet-passing width, the fixability at the end portions may decrease due to heat dissipation from the end portions of the pressure roller 110. On the other hand, if the width W is excessively large, the temperatures in non-sheet-passing portions can rise easily. If the temperatures are controlled to be equal by passing the sheets P at intervals that prevent the temperatures from exceeding a heat resistance temperature of a fixing member, the productivity decreases as described above. Thus, in the present exemplary embodiment, the length of the resistance heating elements 201 and 202 is increased by 1 mm rightward and increased by 1 mm leftward from the letter size of 216 mm, which is the maximum conveyable width of the image forming apparatus 50. In other words, the width W of the resistance heating elements 201 and 202 in the longitudinal direction is 218 mm.

The resistance heating elements 201 and 202 are arranged in series via a conductor 203 on the substrate 207 and are covered with a heating element protection layer 209. A conductive electrode portion 204 is provided at an end portion of the resistance heating element 201, and a conductive electrode portion 205 is provided at an end portion of the resistance heating element 202. A current is passed from the conductive electrode portions 204 and 205 to cause the resistance heating elements 201 and 202 to generate heat. A width Wb of the substrate 207 in the longitudinal direction is 270 mm so as to accommodate the resistance heating elements 201 and 202, the conductor 203, the conductive electrode portions 204 and 205, and the heating element protection layer 209.

As illustrated in FIG. 2A, the temperature detection element 115 for detecting the temperature of the ceramic substrate (the substrate 207) that is risen by the heat generated by the resistance heating elements 201 and 202 is arranged at the back surface of the heater 113. The temperature of the heater 113 is adjusted by controlling the current passed from the conductive electrode portions 204 and 205 to the resistance heating elements 201 and 202 in FIG. 5A, based on signals detected by the temperature detection element 115.

<Heat Conductive Member>

The heat conductive member 140 will be described next. The heat conductive member 140 for equalizing the temperature of the heater 113 is provided on the back surface of the heater 113. FIG. 5B is a schematic diagram of the heat conductive member 140 provided on the back surface of the heater 113 as viewed from the direction indicated by the arrow A2 in FIG. 2A. FIGS. 5C and 5D are schematic cross-sectional diagrams of the heat conductive member 140 and the heater 113 that are fitted into the heater holder 130 in the longitudinal direction. FIG. 5C is a view from the direction indicated by the arrow A2 in FIG. 2A, and FIG. 5D is a view from a downstream side in the conveyance direction of the sheet P.

The heater holder 130 has a shape into which the heater 113 and the heat conductive member 140 can be fitted, and a groove of the heater holder 130 into which the heater 113 is to be fitted is slightly larger in size than the heater 113 so that the groove can accommodate the heater 113 even if the heater 113 generates heat and thermally expands. The alumina of the substrate 207 of the heater 113 is high in heat conductivity, and when the heater 113 starts heating, the alumina thermally expands greatly earlier than the heater holder 130. A width We, in the longitudinal direction, of the groove of the heater holder 130 into which the heater 113 is to be fitted is 272 mm, which is increased by 2 mm relative to the width Wb of the substrate 207 of the heater 113, which is 270 mm. The heater 113 is fitted into the heater holder 130 so that the side of the conductive electrode portions 204 and 205 abuts against the groove wall. Further, a width Wd, in the transverse direction, of the groove into which the heater 113 is to be fitted is 6.5 mm, which is increased by 0.5 mm relative to the width Wh of the heater 113, which is 6 mm. The heater 113 is fitted into the heater holder 130 so as to abut against the downstream side in the conveyance direction of the sheet P.

The higher the heat conductivity of the heat conductive member 140 is than that of the material of the substrate 207 of the heater 113, the higher the effect of equalizing the temperatures of fixing members, such as the heater 113, the fixing film 112, and the pressure roller 110, is. As described above, the heat conductive member 140 can be provided by applying a silver paste having high heat conductivity to the substrate 207 or by bringing a graphite sheet or a metal plate such as an aluminum plate into contact with the substrate 207. Use of a graphite sheet or a metal plate is advantageous in that the heat capacity of the heat conductive member 140 can be adjusted easily by adjusting the thickness of the graphite sheet or the metal plate.

In the present exemplary embodiment, an aluminum plate that has relatively high heat conductivity among metals and can be provided inexpensively is used as the heat conductive member 140. The thicker the heat conductive member 140 is, the higher the heat equalization effect is. Thus, as described above, the productivity of the sheet P that has a relatively narrow width with respect to the width W of the resistance heating elements 201 and 202 in the longitudinal direction improves. However, the heat capacity is increased and the rise time of the heater 113 is delayed accordingly. Thus, the material and thickness of the heat conductive member 140 are to be adjusted based on a balance between the productivity of the sheet P and the rise time of the heater 113.

In the present exemplary embodiment, the heat conductive member 140 uses the aluminum plate having a thickness of 0.3 mm and a width of 6 mm in the transverse direction, which is the same as the width Wh of the heater 113. With the heat conductive member 140 that is wider in the longitudinal direction than the resistance heating elements 201 and 202 of the heater 113, the effect of reducing the temperatures at the non-sheet-passing portions in the case of using the sheet P having a narrow width, such as a small-size sheet, is enhanced. However, in a case where the sheet P having a large width, such as a letter-size sheet, is used and the non-sheet-passing portions are small, the heat may dissipate from the end portions, and the fixability at the end portions may decrease. The width of the heat conductive member 140 in the longitudinal direction is desirably adjusted based on a balance between the heat equalization effect at the non-sheet-passing portions in using a small-size sheet and the fixability at the end portions in using a large-size sheet. In the present exemplary embodiment, the width of the heat conductive member 140 in the longitudinal direction is 218 mm, which is the same as the width W of the resistance heating elements 201 and 202 of the heater 113 in the longitudinal direction.

The heat generation by the heater 113 causes the heat conductive member 140 to rise in temperature and thermally expand. The heat conductive member 140, which is the aluminum plate, is higher in linear expansion coefficient than the heater holder 130 using LCP. Thus, repeating a heat cycle of heating and cooling may shift the position of the heat conductive member 140. A change in the position of the heat conductive member 140 in the longitudinal direction changes the heat equalization effect in using a small-size sheet and the fixability at the end portions in using a large-size sheet. Thus, the heat conductive member 140 includes regulation portions 140*a* as first and second regulation members for regulating the position of the heat conductive member 140 in the longitudinal direction with respect to the heater holder 130.

A pressure structure of the fixing nip portion No according to the present exemplary embodiment is as described above. More specifically, the pressure is higher at the end portions than at the center portion, and the width of the fixing nip portion No is greater at the end portions than at the center portion. When the heat conductive member 140 thermally expands due to the heat generation by the heater 113, the heat conductive member 140 is not shifted easily in the regions where the pressure is high in the longitudinal direction, due to a high frictional force between the heat conductive member 140 and the heater holder 130 and the heater 113. On the other hand, the heat conductive member 140 is shifted easily in the region where the pressure is relatively low in the longitudinal direction, due to a relatively low frictional force therebetween. Thus, in the present exemplary embodiment, the regulation portions 140*a* for determining the position of the heat conductive member 140 in the longitudinal direction are provided at both end portions in the longitudinal direction, which are the regions where the pressure is high and the width of the fixing nip portion No is wide in the longitudinal direction. In other words, the heat conductive member 140 includes the first regulation member and the second regulation member in the longitudinal direction. The regulation portions 140*a* of the heat conductive member 140 each have a width 140*a*W of 5 mm in the longitudinal direction and are fitted into regulation grooves 130*a* of the heater holder 130 each having substantially the same width as the width 140*a*W, so that the positions of the heat conductive member 140 and the heater holder 130 in the longitudinal direction are determined.

In the present exemplary embodiment, the heat conductive member 140 has a single continuous structure in the longitudinal direction. The heat conductive member 140 includes a non-contact portion 140*b* at the center portion in the longitudinal direction. The non-contact portion 140*b* is bent in U-shape to have a distance from the heater 113 in the thickness direction. As illustrated in FIGS. 5C and 5D, the heater holder 130 has a hole 130*b* as an opening portion at the center portion in the longitudinal direction so as to avoid the non-contact portion 140*b* of the heat conductive member 140. The non-contact portion 140*b* of the heat conductive member 140 can also be referred to as a non-abutment region, which does not abut against the heater 113, and regions of the heat conductive member 140 on both sides of the non-abutment region in the longitudinal direction can also be referred to as abutment regions, which abut against the heater 113.

When the heater 113 generates heat, the heat conductive member 140 thermally expands toward the center portion because the positions of the end portions are regulated by the regulation portions 140*a* at the end portions. FIG. 5E is a schematic diagram illustrating a case where the heat conductive member 140 is heated and thermally expands. The heat conductive member 140 thermally expands from the end portions, where the positions are regulated, toward the center portion and elongates, but the thermal expansion is absorbed by the deflection of the non-contact portion 140*b* as illustrated in FIG. 5E. This prevents the heat conductive member 140 from being shifted in the longitudinal direction, prevents the heat conductive member 140 from being deformed to push the heater 113 upward, and prevents the regulation portions 140*a* at the end portions from being damaged. In other words, the heat conductive member 140 serving as a heat equalization member includes a first abutment region, a first non-abutment region, and a second abutment region in this order when the heater 113 is viewed from one end side thereof toward another end side thereof in the longitudinal direction.

A width (length) Wa from each end portion of the heat conductive member 140 to the non-contact portion 140*b* at the center portion in the longitudinal direction is 107 mm. The non-contact portion 140*b* has a width Y of 4 mm. A thermal expansion amount $\Delta L_{TE}$ of the heat conductive member 140 is obtained by the formula $\Delta L_{TE}=\alpha\Delta t$, where $L_{TE}$ is the length of the heat conductive member 140, $\alpha$ is the linear expansion coefficient of the heat conductive member 140, and $\Delta t$ is a temperature rise amount. A heat resistance temperature of silicone rubber, which is a material of the pressure roller 110, is 230° C. in general, and in the present exemplary embodiment, throughput is controlled and reduced so that the surface temperature of the pressure roller 110 at the non-sheet-passing portions does not exceed 230° C. in a case where continuous printing is performed on small-size sheets.

When the surface temperature of the pressure roller 110 at the non-sheet-passing portions reaches 230° C., the temperature of the surface of the heater 113 on which the heat conductive member 140 is provided approximately reaches 270° C. The heat conductive member 140 according to the present exemplary embodiment uses aluminum as the material, and the linear expansion coefficient $\alpha$ is about $2.4\times10^{-5}$/° C. In a case where, for example, the temperature rises from a room temperature of 25° C. to 270° C. and the temperature rise amount $\Delta t$ is 245° C., the thermal expansion amount $\Delta L$ of the width Wa, which is 107 mm, of the heat conductive member 140 in the longitudinal direction is about 0.6 mm. In a case where each width Wa, which is 107 mm, of the heat conductive member 140 in the longitudinal direction is increased by 0.6 mm due to the thermal expansion from the regulation portions 140*a* at the right and left end portions toward the center portion, the U-shaped portion of the non-contact portion 140*b* deflects in directions indicated by arrows A4 in FIG. 5E. Consequently, the non-contact portion 140*b* is deformed to have a width Yh of about 2.8 mm. In other words, the non-contact portion 140*b* is deformed so that the width Y of 4 mm before the thermal expansion of the heat conductive member 140 shrinks to the width Yh of 2.8 mm after the thermal expansion.

In a case where the non-contact portion 140*b* deflects within an elastic deformation region when the heat conductive member 140 thermally expands, a fatigue failure in the non-contact portion 140*b* of the heat conductive member 140 can be prevented even if expansion and contraction are repeated due to the heat cycle of heating and cooling. Since the heat conductive member 140 is the aluminum plate, which is a material without a yield point on a stress-strain curve, a fatigue failure in the non-contact portion 140*b* due to the heat cycle can be prevented generally by setting a shape of the non-contact portion 140*b* so that the non-contact portion 140*b* deflects within a deformation region having a proof stress of 0.2% or less.

The non-contact portion 140*b* of the heat conductive member 140 according to the present exemplary embodiment is U-shaped. By being U-shaped, the non-contact portion 140*b* can deflect entirely as indicated by the arrows A4 in FIG. 5E when the heat conductive member 140 thermally expands in the longitudinal direction, so that the deformation due to the thermal expansion is easily absorbed. The greater a height Hh of the U-shape of the non-contact portion 140*b* and a radius R of an arc portion of the non-contact portion 140*b* are, the more easily the thermal expansion of the heat conductive member 140 is absorbed. However, if the non-contact portion 140*b* is excessively large, heat that flows to the right and to the left in the longitudinal direction decreases, so that the heat equalization effect decreases. Thus, the heat equalization effect of the heat conductive member 140 can be enhanced by minimizing the size of the non-contact portion 140*b* within a range where the deflection of the non-contact portion 140*b* due to the thermal expansion of the heat conductive member 140 is within the elastic deformation region (the deformation region with a proof stress of 0.2% or less). In the present exemplary embodiment, the non-contact portion 140*b* is U-shaped so that the non-contact portion 140*b* can deflect entirely due to the thermal expansion and the size of the non-contact portion 140*b* is minimized as described above. More specifically, the non-contact portion 140*b* is shaped so that the height Hh is 8 mm and the radius R of the arc portion is 2 mm in FIG. 5D in order to keep the deflection of the non-contact portion 140*b* due to the thermal expansion within the deformation region with a proof stress of 0.2% or less if the temperature of the heat conductive member 140 reaches 230° C.

Conventionally, if the heat conductive member 140 having a single continuous structure in the longitudinal direction is used, the heat conductive member 140 may fail to fit into the heater holder 130 due to thermal expansion and be deformed, or the regulation portions 140*a* at the end portions may be damaged, as described above. Thus, there is a structure in which the heat conductive member 140 is divided into a plurality of pieces and the plurality of pieces is arranged in the longitudinal direction. However, dividing the heat conductive member 140 in the longitudinal direction relatively decreases the heat equalization effect in the longitudinal direction. Even with the structure using the heat conductive member 140 having a single continuous structure without dividing the heat conductive member 140 in the longitudinal direction as in the present exemplary embodiment, it is possible to prevent the heat conductive member 140 from being deformed or damaged due to thermal expansion by providing the non-contact portion 140*b* for absorbing the expansion and contraction due to the thermal expansion. Further, since the heat conductive member 140 is not divided in the longitudinal direction and has a single continuous structure from one end portion thereof to another end portion thereof in the longitudinal direction, the heat flows in the longitudinal direction are not interrupted, and a similar heat equalization effect to that of the heat conductive member 140 that is not divided in the longitudinal direction is produced.

<Effects>

Using the structure according to the present exemplary embodiment in which the heat conductive member 140 includes the non-contact portion 140*b* and structures according to comparative examples, a test of comparing temperature rises at the non-sheet-passing portions and a heat cycle test to check whether the heat conductive member 140 was deformed or damaged was conducted. The structure according to the present exemplary embodiment is the structure illustrated in FIGS. 5A to 5E in which the non-contact portion 140*b*, which is bent in U-shape, is provided at the center portion of the heat conductive member 140. The structures according to the comparative examples are three structures illustrated in FIGS. 6A, 6B, and 6C. The structures according to the comparative examples are similar to the structure according to the present exemplary embodiment except for the shape of the heat conductive member 140 and the shape of the heater holder 130 into which the heat conductive member 140 is to be fitted.

Figures 6A, 6B, 6C:
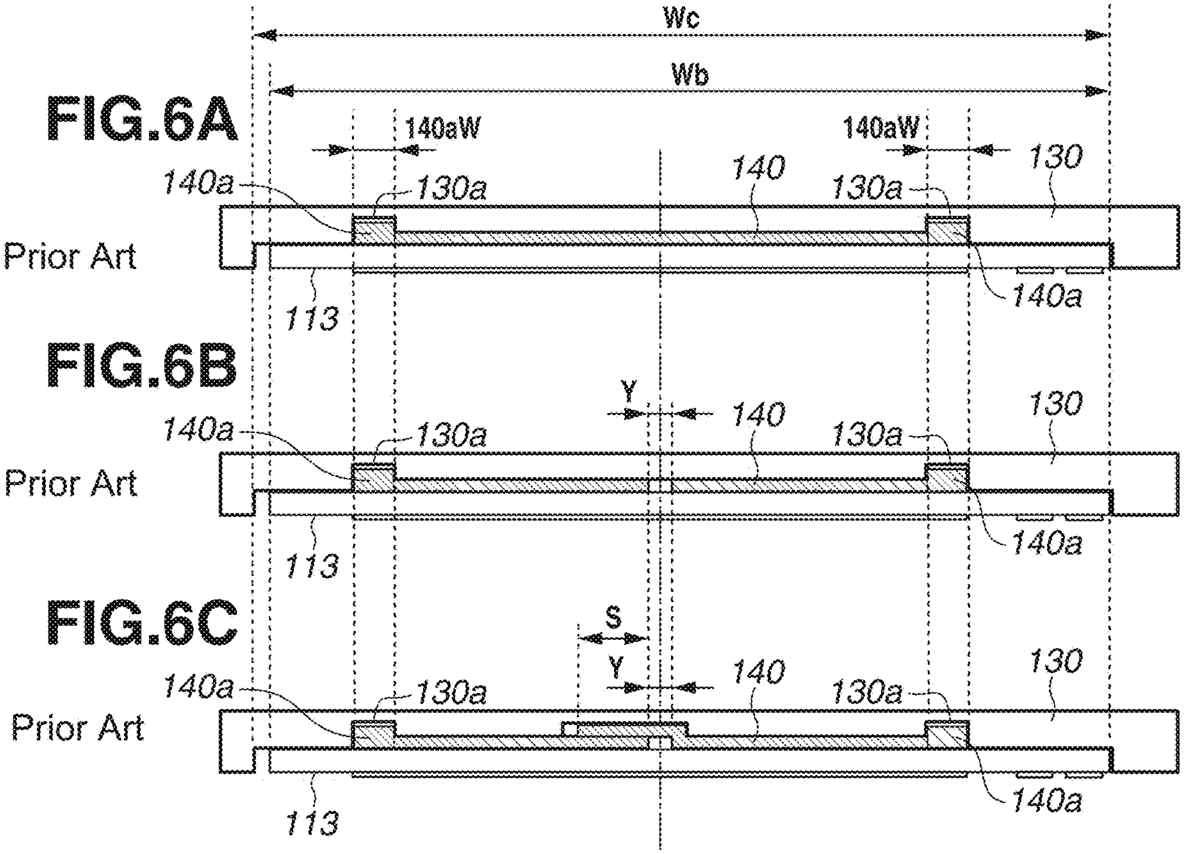
FIG.6A Prior Art
FIG.6B Prior Art
FIG.6C Prior Art
FIGS. 6A to 6C are diagrams illustrating heat conductive members according to comparative examples.

FIG. 6A illustrates the heat conductive member 140 having a single continuous structure from one end portion thereof to another end portion thereof in the longitudinal direction.

FIG. 6B illustrates the heat conductive member 140 divided into two right and left portions at a center portion thereof in the longitudinal direction, and the width Y is 4 mm considering thermal expansion of the right and left portions of the heat conductive member 140. FIG. 6C illustrates the heat conductive member 140 divided into two right and left portions in the longitudinal direction, and the right and left portions of the heat conductive member 140 are in contact with each other in a contact portion S in the thickness direction. In the structures according to the comparative examples, as in the present exemplary embodiment, the pressure of the pressure roller 110 is high at both end portions, and the regulation portions 140*a* for regulating the position of the heat conductive member 140 in the longitudinal direction with respect to the heater holder 130 are provided at both end portions.

The test of comparing the temperature rises at the non-sheet-passing portions was conducted by continuously passing 150 sheets P of A4 size with a grammage of 128 g/m$^2$ and measuring the surface temperature of the pressure roller 110 at the non-sheet-passing portions outside the A4 size in the longitudinal direction using thermography. Printing was performed at two different printing speeds, more specifically, a process speed of 40 pages per minute (ppm) for printing 40 sheets P per minute and a process speed of 50 ppm for printing 50 sheets P per minute while the temperature of the heater 113 was adjusted so that the fixability of the toner to every sheet P is the same.

In the heat cycle test, an operation of printing two sheets P at a process speed of 40 ppm and then stopping for 10 minutes for natural cooling was performed 1000 times, and whether the regulation portions 140*a* at the end portions were damaged or deformed was checked. Table 1 shows results of the comparison test.

TABLE 1

| Structures | | Surface temperature of pressure roller at non-sheet-passing portions: 40 ppm | Surface temperature of pressure roller at non-sheet-passing portions: 50 ppm | Heat cycle test: State of regulation portions of heat conductive member |
|---|---|---|---|---|
| Structures according to comparative examples | Structure illustrated in FIG. 6A | 214° C.: Acceptable | 224° C.: Acceptable | Damaged |
| | Structure illustrated in FIG. 6B | 234° C.: Unacceptable | 248° C.: Unacceptable | Undamaged |
| | Structure illustrated in FIG. 6C | 224° C.: Acceptable | 237° C.: Unacceptable | Undamaged |
| Structure according to present exemplary embodiment | | 215° C.: Acceptable | 226° C.: Acceptable | Undamaged |

The heat conductive member 140 illustrated in FIG. 6A has a high heat equalization effect. Thus, the temperature of the pressure roller 110 at the non-sheet-passing portions was successfully controlled at 230° C., which is the heat resistance temperature of the silicone rubber, or below. However, the regulation portions 140*a* of the heat conductive member 140 were found damaged in the heat cycle test. The regulation portions 140*a* of the heat conductive member 140 illustrated in FIG. 6B were found undamaged in the heat cycle test. However, since the heat conductive member 140 is divided, the heat equalization effect is low, and the temperature of the pressure roller 110 at the non-sheet-passing portions exceeded 230° C. both in the test of comparing the temperature rises at the non-sheet-passing portions at 40 ppm and the test of comparing the temperature rises at the non-sheet-passing portions at 50 ppm. The heat conductive member 140 illustrated in FIG. 6C absorbs the thermal expansion in the contact portion S. Thus, the regulation portions 140*a* of the heat conductive member 140 were found undamaged in the heat cycle test. However, the effect of reducing a temperature rise at the non-sheet-passing portions is lower than that of the structure illustrated in FIG. 6A, in which the heat conductive member 140 is not divided, due to the contact thermal resistance of the contact portion S of the heat conductive member 140. Thus, the temperature of the pressure roller 110 at the non-sheet-passing portions exceeded 230° C. in the test of comparing the temperature rises at the non-sheet-passing portions at 50 ppm.

In the structure according to the present exemplary embodiment in which the heat conductive member 140 includes the non-contact portion 140*b*, the non-contact portion 140*b* absorbs the thermal expansion. Thus, the regulation portions 140*a* of the heat conductive member 140 were found undamaged in the heat cycle test. Furthermore, since the heat conductive member 140 has a single continuous structure in the longitudinal direction, the heat equalization effect is high. Thus, the temperature of the pressure roller 110 at the non-sheet-passing portions was controlled to 230° C. or below in the test of comparing the temperature rises at the non-sheet-passing portions.

As described above, providing the non-contact portion 140*b*, which is not in contact with the heater 113, in the heat conductive member 140 can absorb the expansion and contraction due to the thermal expansion, prevent the heat conductive member 140 from being damaged or deformed, and suppress a temperature rise at the non-sheet-passing portions.

A structure according to a second exemplary embodiment in which the heat conductive member 140 includes a plurality of the non-contact portions 140*b*, which is not in contact with the heater 113, will be described. Components of the image forming apparatus 50 similar to those in the first exemplary embodiment are given the same reference numerals, and detailed description thereof will be omitted.

In a case where the elastic layer 116 of the pressure roller 110 uses foamed rubber, paper wrinkles may sometimes be prevented by making the width of the fixing nip portion No wider at the center portion than at the end portions. When the foamed rubber is crushed at the fixing nip portion No, the inside air is removed, and the surface of the fixing nip portion No comes closer to the core metal 117, so that the radius of rotation of the fixing nip portion No for conveying the sheet P decreases. Thus, the higher the pressure is and the greater the amount of crush at the fixing nip portion No is, the lower the conveyance speed of the sheet P is. It is commonly known that setting a higher conveyance speed of the sheet P for the end portions than for the center portion in the longitudinal direction is effective for prevention of paper wrinkles. Thus, with the fixing nip portion No that crushes the formed rubber more at the center portion than at the end portions, i.e., the fixing nip portion No having a greater width at the center portion than at the end portions, the conveyance speed of the sheet P is higher at the end portions than at the center portion, so that paper wrinkles are prevented.

Figure 7:
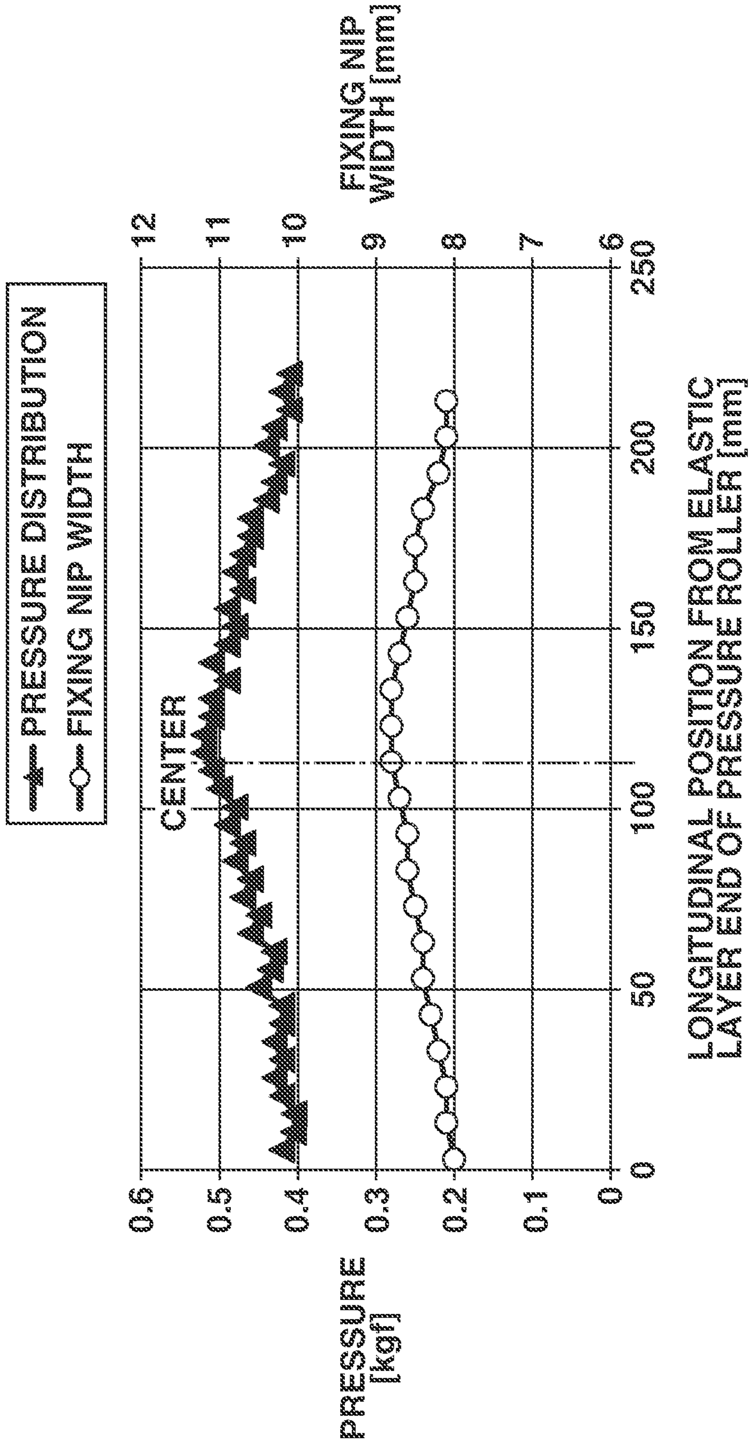
FIG. 7 is another graph of the width of the fixing nip portion against the pressure of the fixing nip portion.

In the present exemplary embodiment, the heater holder 130 undergoes the crown correction so that the fixing nip portion No is thicker at the center portion than at the end portions, as in the first exemplary embodiment. More specifically, the width of the fixing nip portion No is adjusted so that the fixing nip portion No is thicker by about 10% at the center portion than at the end portions, and the amount of crown correction of the heater holder 130 is set at 600 μm. FIG. 7 illustrates the width of the fixing nip portion No and the pressure distribution in the longitudinal direction. The width of the fixing nip portion No and the pressure distribution in the longitudinal direction were measured using the same method as that in the first exemplary embodiment. The width of the fixing nip portion No increases from both end portions toward the center portion, and the center portion has a width of 8.8 mm, whereas each end portion has a width of 8.0 mm. Similarly to the width of the fixing nip portion No, the pressure distribution in the longitudinal direction in this case has the highest pressure at the center portion, and the pressure decreases toward both end portions. In other words, the greater the width of the fixing nip portion No is, the higher the pressure of the fixing nip portion No is.

<Heat Conductive Member>

Figure 8:
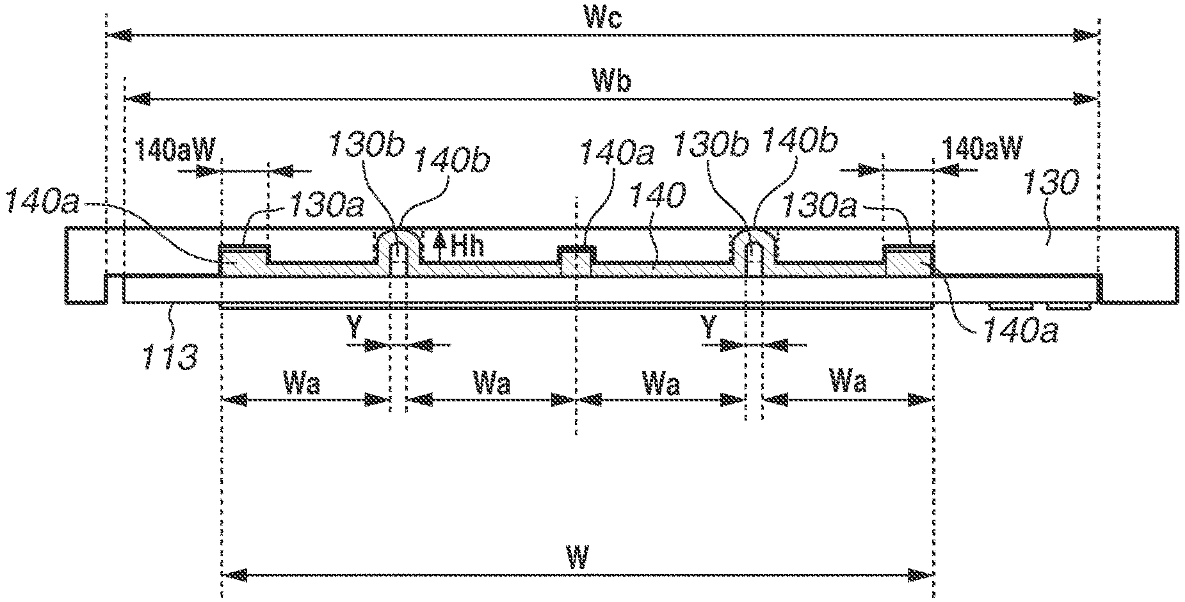
FIG. 8 is a diagram illustrating another example of the heat conductive member.

The heat conductive member 140 will be described next. FIG. 8 is a schematic cross-sectional diagram of the heat conductive member 140 and the heater 113 that are fitted into the heater holder 130 in the longitudinal direction. In the present exemplary embodiment, the heat conductive member 140 includes two non-contact portions 140*b*, which are not in contact with the heater 113, at two different positions, one on the right and the other on the left. Further, the heater holder 130 includes two holes 130*b* at two positions corresponding to the non-contact portions 140*b*. In other words, the heater holder 130 includes a first opening portion and a second opening portion. At the positions corresponding to the non-contact portions 140*b*, depressions can be provided instead of the holes 130*b*. In other words, the heater holder 130 can include a first depressed portion and a second depressed portion. Details thereof will be described below.

The heat conductive member 140 also includes three regulation portions 140*a* for regulating the position of the heat conductive member 140 in the longitudinal direction with respect to the heater holder 130 at three different positions. Two of the regulation portions 140*a* at the end portions are similar to those according to the first exemplary embodiment, and another regulation portion 140*a* is provided at the center portion.

In other words, the heat conductive member 140 includes a first regulation member, a second regulation member, and a third regulation member in the longitudinal direction. As described above, since one of the regulation portions 140*a* for regulating the position of the heat conductive member 140 in the longitudinal direction is provided in the region where the fixing nip portion No is thick and the pressure is high in the longitudinal direction, the heat conductive member 140 is not shifted easily.

When the heater 113 generates heat and the temperature of the heat conductive member 140 rises due to the generated heat, the heat conductive member 140 thermally expands from the center portion toward both end portions. As described above, since the right and left end portions of the heat conductive member 140 each elongate by about 0.6 mm due to the thermal expansion, in a case where the sheet P having a large width, such as a letter-size sheet, is used and the non-sheet-passing portions are small, the heat at the end portions may be dissipated, and the fixability at the end portions may decrease. In a case where the regulation portions 140*a* are also provided at both end portions of the heat conductive member 140 to prevent changes in position of the end portions, the heat conductive member 140 may be deformed by the heat cycle, or the regulation portions 140*a* at the end portions may be damaged, as described above.

In the present exemplary embodiment, as illustrated in FIG. 8, the regulation portions 140*a* are provided at both end portions of the heat conductive member 140 to prevent changes in position of the end portions, as in the first exemplary embodiment. Furthermore, the non-contact portion 140*b* is provided between the regulation portion 140*a* at the center portion and the regulation portion 140*a* at the right end portion and is also provided between the regulation portion 140*a* at the center portion and the regulation portion 140*a* at the left end portion. In other words, the heat conductive member 140 serving as a heat equalization member includes a first abutment region, a first non-abutment region, a second abutment region, a second non-abutment region, and a third abutment region in this order when the heater 113 is viewed from one end side thereof toward another end side thereof in the longitudinal direction.

With the foregoing structure, the thermal expansion from the center portion, where the position of the heat conductive member 140 is regulated, toward the end portions and the thermal expansion from the end portions toward the center portion are absorbed by the deflections of the non-contact portions 140*b* at the two positions on the right and left. This prevents the heat conductive member 140 from being deformed and also prevents the regulation portions 140*a* at the end portions from being damaged.

In the present exemplary embodiment, the non-contact portion 140*b* is provided in the middle between the regulation portion 140*a* at the center portion and the regulation portion 140*a* at one end portion and is also provided in the middle between the regulation portion 140*a* at the center portion and the regulation portion 140*a* at another end portion. The width Wa of the heat conductive member 140 from the regulation portion 140*a* at the center to each of the non-contact portions 140*b* and the width Wa of the heat conductive member 140 from the regulation portion 140*a* at each end portion to the non-contact portion 140*b* on the same side are each 53.5 mm. Since the heat conductive member 140 includes the plurality of non-contact portions 140*b*, the width Wa from the regulation portion 140*a* to the non-contact portion 140*b* is reduced. Thus, the amount of thermal expansion from the regulation portion 140*a* to the non-contact portion 140*b* also decreases, so that the size of each non-contact portion 140*b* can be reduced. Each non-contact portion 140*b* according to the present exemplary embodiment is U-shaped as in the first exemplary embodiment. Each non-contact portion 140*b* is shaped so that the height Hh is 4 mm and the radius R of the arc portion is 1 mm in order to keep the deflections of the non-contact portions 140*b* due to the thermal expansion within the deformation region with a proof stress of 0.2% or less if the temperature of the heat conductive member 140 reaches 230° C.

The heat cycle test was conducted on the structure according to the present exemplary embodiment as in the first exemplary embodiment.

In the test on the structure according to the present exemplary embodiment, the heat conductive member 140 was not found deformed, and the regulation portions 140*a* were found undamaged. Further, since the heat conductive member 140 has a single continuous structure from one end portion thereof to another end portion thereof in the longitudinal direction as in the first exemplary embodiment, the effect of suppressing a temperature rise at the non-sheet-passing portions is produced. As described above, the heat conductive member 140 can include the plurality of non-contact portions 140*b*, which is not in contact with the heater 113, and the non-contact portions 140*b* prevent the heat conductive member 140 from being damaged or deformed and suppress a temperature rise at the non-sheet-passing portions.

Figures 9A, 9B, 9C:
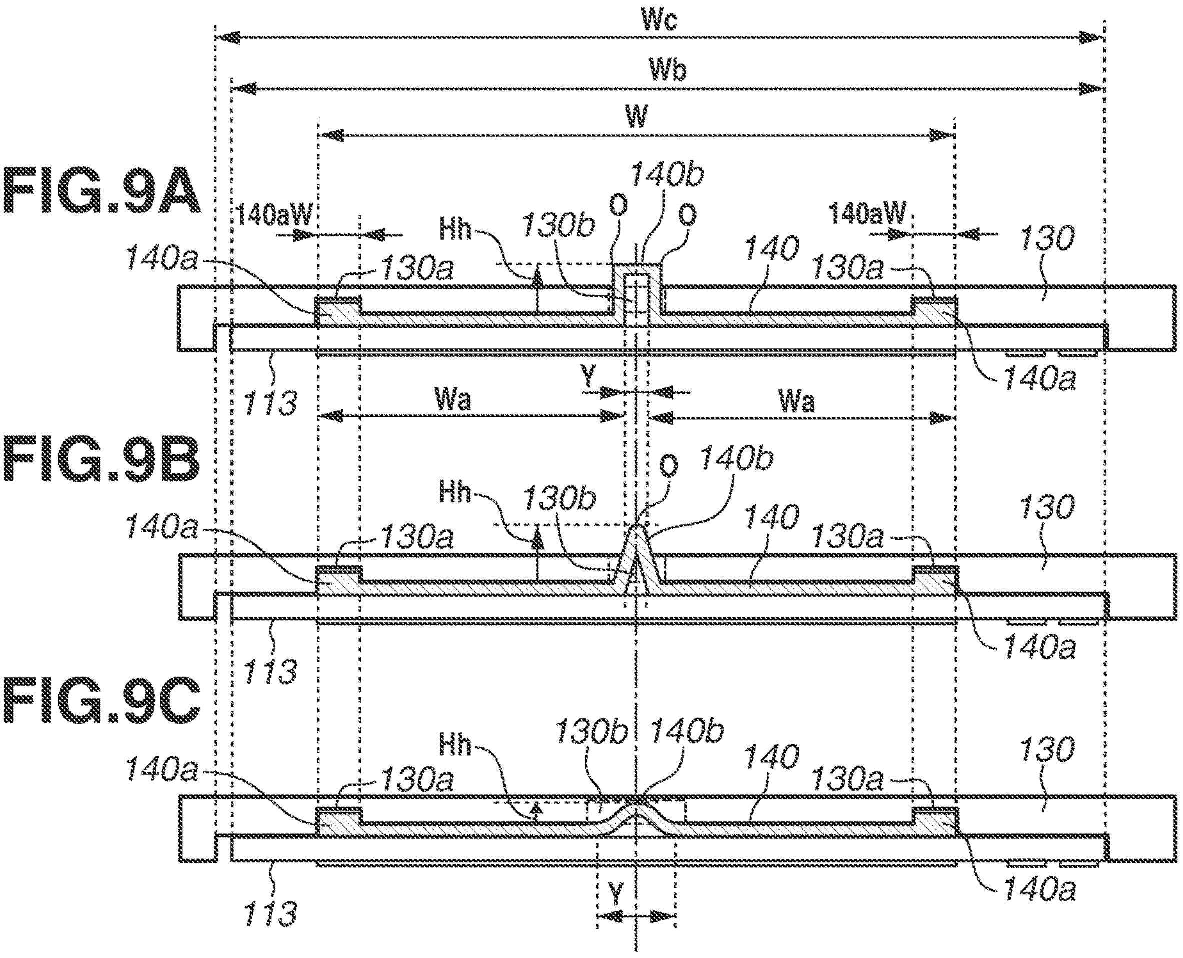
FIGS. 9A to 9C are diagrams each illustrating yet another example of the heat conductive member.

In the first and second exemplary embodiments described above, each non-contact portion 140*b* of the heat conductive member 140 is U-shaped, but the shape of each non-contact portion 140*b* is not limited thereto. FIGS. 9A to 9C illustrate examples of the shape of the heat conductive member 140 according to a third exemplary embodiment. Each non-contact portion 140*b* can be bent in squared U-shape as illustrated in FIG. 9A or can be bent in V-shape as illustrated in FIG. 9B. Generally, in processing by press molding, flat sheet metal is stamped and pressed. At this time, if the sheet metal is stamped and pressed into a shape such as the shape of the non-contact portion 140*b*, the sheet metal is subjected to plastic deformation and processed.

In a case where the non-contact portion 140*b* is to be U-shaped as in the first and second exemplary embodiments, the greater the radius R of the arc portion is, the less the degree of plastic deformation is. However, in a case where the non-contact portion 140*b* is to be shaped to have a bent portion O, such as the squared U-shape illustrated in FIG. 9A or the V-shape illustrated in FIG. 9B, the degree of plastic deformation increases. Thus, in a case where the non-contact portion 140*b* is to absorb the thermal expansion of the heat conductive member 140, the height Hh of the non-contact portion 140*b* is to be set to be high so that the deformation occurs within the elastic region in order to prevent a fracture in the bent portion O due to stress concentration. Meanwhile, the structures including the bent portion O as illustrated in FIGS. 9A and 9B may be advantageous in that the size of the heat conductive member 140 can be obtained easily by stamping or the positions inside the heating apparatus 100 can be determined easily.

Further, a drawn shape with reduced plastic deformation formed by stamping as illustrated in FIG. 9C can be used. Such a structure without the bent portion O is advantageous in that stress concentration in the bent portion O is prevented and the height Hh of the non-contact portion 140*b* can be set to be low in a case where the thermal expansion of the heat conductive member 140 is to be absorbed by the non-contact portion 140*b*.

While the structure in which the non-contact portion 140*b* has a bilaterally symmetrical shape has been described above, the non-contact portion 140*b* having an asymmetrical shape can be used in a case where space in the heating apparatus 100 is limited. Because the material and length of the heat conductive member 140 and the temperature that the heat conductive member 140 reaches depend on the structure of the heating apparatus 100, the thermal expansion amount ΔL of the heat conductive member 140 and the possible deflection range within the elastic region vary. Thus, the shape, the width Y, and the height Hh of the non-contact portion 140*b* are adjusted and set depending on the structure so that the non-contact portion 140*b* deflects due to the thermal expansion of the heat conductive member 140 within the elastic deformation region. This prevents a fatigue failure in the non-contact portion 140*b* due to the heat cycle, and produces an effect similar to the effect of the non-contact portion 140*b* described above.

The above-described structures according to the first and second exemplary embodiments use one heat conductive member 140. Alternatively, a plurality of the heat conductive members 140 can be provided in a case where the space in the heating apparatus 100 is limited or the electrically-safe wiring distance is limited.

Figure 10:
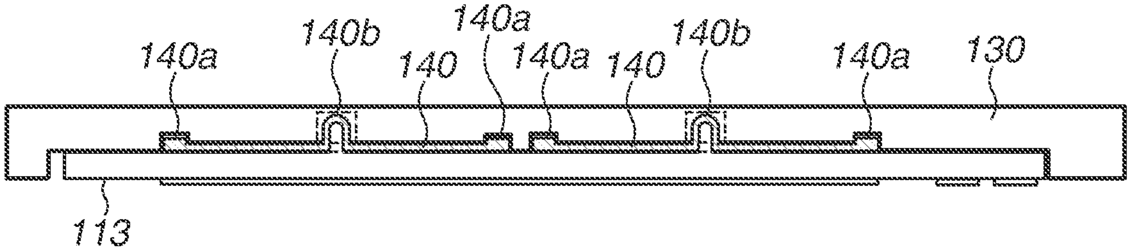
FIG. 10 is a diagram illustrating yet another example of the heat conductive member.

Further, in a case where the image forming apparatus 50 is wide in the longitudinal direction, such as a case where the image forming apparatus 50 supports the sheets P up to A3 size, the plurality of heat conductive members 140 can be provided to reduce the thermal expansion amount ΔL. Even in such a structure in which the plurality of heat conductive members 140 is arranged in the longitudinal direction, each of the heat conductive members 140 can include the non-contact portion 140*b*, which is not in contact with the heater 113, as illustrated in FIG. 10. Because the non-contact portions 140*b* absorb the elongation due to the thermal expansion of the heat conductive members 140, the deformation of the heat conductive members 140 and the breakage of the regulation portions 140*a* are prevented.

In the above-described structures according to the first and second exemplary embodiments, the heater holder 130 has the hole(s) 130*b* to avoid the non-contact portion(s) 140*b* of the heat conductive member 140. As illustrated in FIGS. 9C and 10, instead of a through-hole, a depressed shape (a depressed portion) can be formed to avoid the non-contact portion 140*b*. Because the strength and expected durability of the heater holder 130 depend on the pressure setting of the heating apparatus 100 and the material of the heater holder 130, the shape of the hole 130*b* of the heater holder 130 can be determined depending on the structure.

In the above-described structures according to the first and second exemplary embodiments, the regulation portions 140*a* for regulating the position of the heat conductive member 140 in the longitudinal direction with respect to the heater holder 130 are provided in portions where the pressure is high and the width of the fixing nip portion No is wide in the longitudinal direction. However, in a case where the pressure is sufficiently high and the frictional force between the heater holder 130 and the heat conductive member 140 is strong, the heater holder 130 and the heat conductive member 140 may be positioned without being misaligned even when the regulation portions 140*a* are not provided. In this case, the regulation portions 140*a* may not necessarily be provided. However, because the heat conductive member 140 thermally expands toward a portion where the pressure is low and the frictional force between the heater holder 130 and the heat conductive member 140 is weak in the longitudinal direction, the heat conductive member 140 may be lifted or deformed at the center portion where the pressure is low. Even in this case, it is possible to absorb the thermal expansion of the heat conductive member 140 by providing the non-contact portion 140*b* at a side where the pressure is low (a side where the width of the fixing nip portion No is thin) in the longitudinal direction.

While a configuration for forming a monochrome image has been described above as an example of the configuration of the image forming apparatus 50, the exemplary embodiments are not limited thereto, and the non-contact portion 140*b* can be provided in the heat conductive member 140 of an image forming apparatus for forming and printing a color image by superimposing four colors of yellow, magenta, cyan, and black on top of each other.

While the heating apparatus 100 using the film heating method has been described above, the exemplary embodiments are not limited thereto.

For example, some of heating apparatuses for use in color image forming apparatuses use solid rubber in an elastic layer of a pressure roller or use a film heating method in which an elastic layer is provided in a fixing film to obtain excellent image quality. Even in a case where such a heating apparatus includes the heat conductive member 140, it is possible to produce similar effects by providing the non-contact portion 140*b* in the heat conductive member 140.

Figure 11:
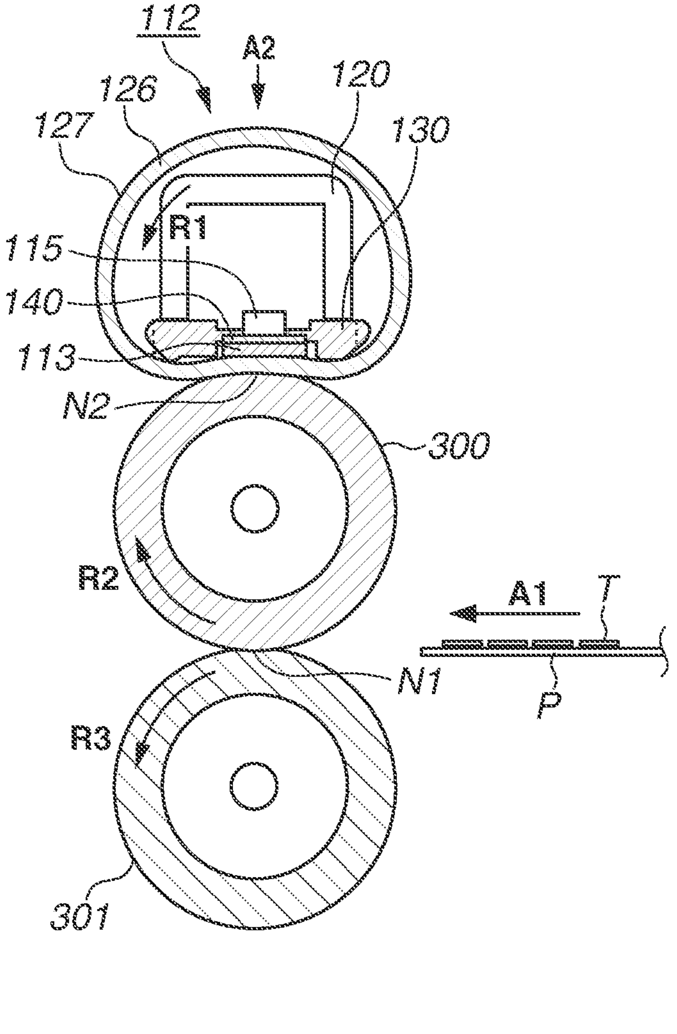
FIG. 11 is a schematic diagram illustrating another example of the configuration of the heating apparatus.

The non-contact portion 140*b* can be provided also in the heat conductive member 140 of a heating apparatus that uses an external heating method as illustrated in FIG. 11. The heating apparatus using the external heating method in FIG. 11 includes the heater 113 inside the fixing film 112, and the heater 113 is pressed against an outer surface of a fixing roller 300 and heats the surface of the fixing roller 300 at a heating nip portion N2. The toner image T is fixed to the sheet P at a fixing nip portion N1 formed by pressing a pressure roller 301, which is configured to rotate in a direction indicated by an arrow R3, against the fixing roller 300. Even in a case where the heat conductive member 140 is provided on the back surface of the heater 113 of such a heating apparatus using the external heating method, it is possible to absorb the expansion and contraction due to the thermal expansion, prevent the breakage and deformation of the heat conductive member 140, and suppress a temperature rise at the non-sheet-passing portions by providing the non-contact portion 140*b* in the heat conductive member 140.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-121182, filed Jul. 29, 2022, which is hereby incorporated by reference herein in its entirety.

What is claimed is:

1. A heating apparatus comprising:

a heater including an elongated substrate and a heating element arranged on a first surface of the elongated substrate;

a first rotary member configured to be heated by the heater;

a second rotary member configured to form a nip portion with the heater via the first rotary member;

a holding member configured to hold the heater; and a heat equalization member arranged in contact with a second surface of the elongated substrate that is opposite to the first surface and configured to equalize heat across the elongated substrate, wherein, in a case where a direction of a long side of the first surface of the heater is defined as a longitudinal direction, a direction of the first surface that is perpendicular to the longitudinal direction is defined as a transverse direction, and a direction that is perpendicular to the longitudinal direction and the transverse direction is defined as a thickness direction, the heat equalization member is arranged between the heater and the holding member in the thickness direction, wherein the heat equalization member includes, in the longitudinal direction, first and second abutment regions that abut against the heater, and a first non-abutment region that does not abut against the heater, wherein the first abutment region, the first non-abutment region, and the second abutment region are arranged in this order in the longitudinal direction, wherein the first non-abutment region is formed by being bent from the first abutment region and the second abutment region toward the holding member in the thickness direction, and wherein the first non-abutment region deforms in a case where the heat equalization member thermally expands.

2. The heating apparatus according to claim 1, wherein the first non-abutment region is U-shaped, V-shaped, or squared U-shaped.

3. The heating apparatus according to claim 1, wherein the heat equalization member includes first and second regulation members each configured to regulate a position of the heat equalization member with respect to the holding member, and wherein the heat equalization member includes, in the longitudinal direction, the first regulation member at a position corresponding to the first abutment region and the second regulation member at a position corresponding to the second abutment region.

4. The heating apparatus according to claim 1, wherein the holding member includes an opening portion in a region corresponding to the first non-abutment region in the longitudinal direction.

5. The heating apparatus according to claim 1, wherein the holding member includes a depressed portion in a region corresponding to the first non-abutment region in the longitudinal direction.

6. The heating apparatus according to claim 1, wherein the first rotary member is a film, wherein the second rotary member is a pressure roller, and the heater is arranged in an internal space of the film, and wherein, in a case where an image formed on a sheet is heated, the heater and the pressure roller nip the film and the image formed on the sheet is heated at the nip portion via the film.

7. An image forming apparatus comprising:

an image forming unit configured to form an image on a sheet; and the heating apparatus according to claim 1, wherein the heating apparatus is configured to fix the image formed on the sheet.

8. A heating apparatus comprising:

a heater including an elongated substrate and a heating element arranged on a first surface of the elongated substrate;

a first rotary member configured to be heated by the heater;

a second rotary member configured to form a nip portion with the heater via the first rotary member;

a holding member configured to hold the heater; and a heat equalization member arranged in contact with a second surface of the elongated substrate that is opposite to the first surface and configured to equalize heat across the elongated substrate, wherein, in a case where a direction of a long side of the first surface of the heater is defined as a longitudinal direction, a direction of the first surface that is perpendicular to the longitudinal direction is defined as a transverse direction, and a direction that is perpendicular to the longitudinal direction and the transverse direction is defined as a thickness direction, the heat equalization member is arranged between the heater and the holding member in the thickness direction, wherein the heat equalization member includes, in the longitudinal direction, first, second, and third abutment regions that abut against the heater, and first and second non-abutment regions that do not abut against the heater, wherein the first abutment region, the first non-abutment region, the second abutment region, the second non-abutment region, and the third abutment region are arranged in this order in the longitudinal direction, wherein the first non-abutment region is formed by being bent from the first abutment region and the second abutment region toward the holding member in the thickness direction, wherein the second non-abutment region is formed by being bent from the second abutment region and the third abutment region toward the holding member in the thickness direction, and wherein the first non-abutment region and the second non-abutment region deform in a case where the heat equalization member thermally expands.

9. The heating apparatus according to claim 8, wherein the first non-abutment region is U-shaped, V-shaped, or squared U-shaped, and wherein the second non-abutment region is U-shaped, V-shaped, or squared U-shaped.

10. The heating apparatus according to claim 8, wherein the heat equalization member includes first, second, and third regulation members each configured to regulate a position of the heat equalization member with respect to the holding member, and wherein the heat equalization member includes, in the longitudinal direction, the first regulation member at a position corresponding to the first abutment region, the second regulation member at a position corresponding to the second abutment region, and the third regulation member at a position corresponding to the third abutment region.

11. The heating apparatus according to claim 8, wherein the holding member includes, in the longitudinal direction, a first opening portion in a region corresponding to the first non-abutment region and a second opening portion in a region corresponding to the second non-abutment region.

12. The heating apparatus according to claim 8, wherein the holding member includes, in the longitudinal direction, a first depressed portion in a region corresponding to the first non-abutment region and a second depressed portion in a region corresponding to the second non-abutment region.

13. The heating apparatus according to claim 8, wherein the first rotary member is a film, wherein the second rotary member is a pressure roller, and the heater is arranged in an internal space of the film, and wherein, in a case where an image formed on a sheet is heated, the heater and the pressure roller nip the film and the image formed on the sheet is heated at the nip portion via the film.

14. A heating apparatus comprising:

a heater including an elongated substrate and a heating element arranged on the elongated substrate;

a first rotary member configured to be heated by the heater;

a second rotary member configured to form a nip portion with the heater via the first rotary member;

a holding member configured to hold the heater; and a heat equalization member arranged in contact with the elongated substrate and configured to equalize heat across the elongated substrate, wherein, in a case where a direction of a long side of the heater is defined as a longitudinal direction, a direction that is perpendicular to the longitudinal direction is defined as a transverse direction, and a direction that is perpendicular to the longitudinal direction and the transverse direction is defined as a thickness direction, the heat equalization member is arranged between the heater and the holding member in the thickness direction, wherein the heat equalization member includes, in the longitudinal direction, first and second abutment portions that abut against the heater, and a non-abutment portion that does not abut against the heater, wherein the first abutment portion, the non-abutment portion, and the second abutment portion are arranged in this order in the longitudinal direction, wherein a position of the heat equalization member relative to the holding member is restricted in the longitudinal direction at one end side of the heat equalization member in the longitudinal direction, and at the other end side of the heat equalization member in the longitudinal direction, wherein the non-abutment portion is formed by being bent from an end side close to where the second abutment portion is located in the longitudinal direction of the first abutment portion and an end side close to where the first abutment portion is located in the longitudinal direction of the second abutment portion toward a direction opposite to a side where the heater is located in the thickness direction, wherein the non-abutment portion is connected to the first abutment portion and the second abutment portion, and wherein in a case where the heat equalization member thermally expands, the distance between the end side close to where the second abutment portion is located in the longitudinal direction of the first abutment portion and the end side close to where the first abutment portion is located in the longitudinal direction of the second abutment portion becomes shorter, so that a part of the non-abutment portion is deformed.

15. The heating apparatus according to claim 14, wherein the first non-abutment portion is U-shaped, V-shaped, or squared U-shaped.

16. The heating apparatus according to claim 14, wherein the heat equalization member includes first and second regulation members each configured to regulate a position of the heat equalization member with respect to the holding member, and wherein the heat equalization member includes, in the longitudinal direction, the first regulation member at a position corresponding to the first abutment portion and the second regulation member at a position corresponding to the second abutment portion.

17. The heating apparatus according to claim 14, wherein the holding member includes an opening portion in a portion corresponding to the first non-abutment portion in the longitudinal direction.

18. The heating apparatus according to claim 14, wherein the holding member includes a depressed portion in a portion corresponding to the first non-abutment portion in the longitudinal direction.

19. The heating apparatus according to claim 14, wherein the first rotary member is a film, wherein the second rotary member is a pressure roller, and the heater is arranged in an internal space of the film, and wherein, in a case where an image formed on a sheet is heated, the heater and the pressure roller nip the film and the image formed on the sheet is heated at the nip portion via the film.

20. An image forming apparatus comprising:

an image forming unit configured to form an image on a sheet; and the heating apparatus according to claim 16, wherein the heating apparatus is configured to fix the image formed on the sheet.

21. A heating apparatus comprising:

a heater including an elongated substrate and a heating element arranged on the elongated substrate;

a first rotary member configured to be heated by the heater;

a second rotary member configured to form a nip portion with the heater via the first rotary member;

a holding member configured to hold the heater; and a heat equalization member arranged in contact with the elongated substrate and configured to equalize heat across the elongated substrate, wherein, in a case where a direction of a long side of the heater is defined as a longitudinal direction, a direction that is perpendicular to the longitudinal direction is defined as a transverse direction, and a direction that is perpendicular to the longitudinal direction and the transverse direction is defined as a thickness direction, the heat equalization member is arranged between the heater and the holding member in the thickness direction, wherein the heat equalization member includes, in the longitudinal direction, first, second, and third abutment portions that abut against the heater, and first and second non- abutment portions that do not abut against the heater, wherein the first abutment portion, the first non-abutment portion, the second abutment portion, the second non-abutment portion, and the third abutment portion are arranged in this order in the longitudinal direction, wherein a position of the heat equalization member relative to the holding member is restricted in the longitudinal direction at one end side of the heat equalization member in the longitudinal direction, and at the other end side of the heat equalization member in the longitudinal direction, wherein the first non-abutment portion is formed by being bent from an end side close to where the second abutment portion is located in the longitudinal direction of the first abutment portion and an end side close to where the first abutment portion is located in the longitudinal direction of the second abutment portion toward a direction opposite to a side where the heater is located in the thickness direction, wherein the second non-abutment portion is formed by being bent from an end side close to where the third abutment portion is located in the longitudinal direction of the second abutment portion and an end side close to where the second abutment portion is located in the longitudinal direction of the third abutment portion toward a direction opposite to a side where the heater is located in the thickness direction, wherein the first non-abutment portion is connected to the first abutment portion and the second abutment portion, wherein the second non-abutment portion is connected to the second abutment portion and the third abutment portion, wherein in a case where the heat equalization member thermally expands, the distance between the end side close to where the second abutment portion is located in the longitudinal direction of the first abutment portion and the end side close to where the first abutment portion is located in the longitudinal direction of the second abutment portion becomes shorter, so that a part of the first non-abutment portion is deformed, and wherein in a case where the heat equalization member thermally expands, the distance between the end side close to where the third abutment portion is located in the longitudinal direction of the second abutment portion and the end side close to where the second abutment portion is located in the longitudinal direction of the third abutment portion becomes shorter, so that a part of the second non-abutment portion is deformed.

22. The heating apparatus according to claim 21, wherein the first non-abutment portion is U-shaped, V-shaped, or squared U-shaped, and wherein the second non-abutment portion is U-shaped, V-shaped, or squared U-shaped.

23. The heating apparatus according to claim 21, wherein the heat equalization member includes first, second, and third regulation members each configured to regulate a position of the heat equalization member with respect to the holding member, and wherein the heat equalization member includes, in the longitudinal direction, the first regulation member at a position corresponding to the first abutment portion, the second regulation member at a position corresponding to the second abutment portion, and the third regulation member at a position corresponding to the third abutment portion.

24. The heating apparatus according to claim 21, wherein the holding member includes, in the longitudinal direction, a first opening portion in a portion corresponding to the first non-abutment portion and a second opening portion in a portion corresponding to the second non-abutment portion.

25. The heating apparatus according to claim 21, wherein the holding member includes, in the longitudinal direction, a first depressed portion in a portion corresponding to the first non-abutment portion and a second depressed portion in a portion corresponding to the second non-abutment portion.

26. The heating apparatus according to claim 21, wherein the first rotary member is a film, wherein the second rotary member is a pressure roller, and the heater is arranged in an internal space of the film, and wherein, in a case where an image formed on a sheet is heated, the heater and the pressure roller nip the film and the image formed on the sheet is heated at the nip portion via the film.

* * * * *